US00RE41359E

(19) United States
(12) Reissued Patent
Laverick et al.

(10) Patent Number: US RE41,359 E
(45) Date of Reissued Patent: Jun. 1, 2010

(54) HOUSING PORTION AND A FACEPLATE PORTION OF A PORTABLE HAND-HELD NAVIGATIONAL DEVICE

(75) Inventors: David Laverick, Overland Park, KS (US); Brian Schoenfish, Kansas City, KS (US); Min H. Kao, Olathe, KS (US)

(73) Assignee: Garmin Corporation (TW)

(21) Appl. No.: 29/209,795
(22) Filed: Jul. 21, 2004

Related U.S. Patent Documents

Reissue of:
(64) Patent No.: Des. 427,919
Issued: Jul. 11, 2000
Appl. No.: 29/111,395
Filed: Sep. 27, 1999

(51) LOC (9) Cl. ..... 10-04
(52) U.S. Cl. ..... D10/65; D10/78; D10/80
(58) Field of Classification Search ..... D10/65, D10/78, 80; 73/128; 340/995; 342/98, 102, 342/113, 115, 352, 356, 357, 359, 417–421; 364/200, 434, 443, 444, 449, 451, 708.1, 364/708.11
See application file for complete search history.

(56) References Cited

U.S. PATENT DOCUMENTS

D395,252 S * 6/1998 Nelson et al. ..... D10/78

(Continued)

*Primary Examiner*—Antoine D Davis
(74) *Attorney, Agent, or Firm*—Samuel M. Korte

(57) CLAIM

The ornamental design for a portable *housing portion and a faceplate portion of a* hand-held navigational device *and the faceplate portion of a portable hand-held navigational device*, as shown and described.

RELATED APPLICATIONS

*More than one reissue application has been filed for U.S. Pat. No. D.427,919. This application is a divisional application of and claims priority benefit to U.S. Reissue Design Patent application Ser. No. 29/157,604, filed on Jan. 9, 2002 incorporated by reference herein, which is a reissue of and claims priority benefit to U.S. Pat. No. D.427,919, filed on Sep. 27, 1999, which is also incorporated by reference herein.*

DESCRIPTION

FIG. 1 is a front elevational view of a first embodiment *showing a portable hand-held navigational device* of the present invention;
FIG. 2 is a bottom plan view thereof;
FIG. 3 is a top plan view thereof;
FIG. 4 is a right side view thereof;
FIG. 5 is a rear elevational view thereof; and,
FIG. 6 is a left side view thereof;
*FIG. 7 is a front elevational view of a second embodiment showing the faceplate portion of a portable hand-held navigational device of the present invention;*
*FIG. 8 is a bottom plan of the embodiment shown in FIG. 7;*
*FIG. 9 is a top plan view of the embodiment shown in FIG. 7;*
*FIG. 10 is a right side view of the embodiment shown in FIG. 7; and*
*FIG. 11 is a rear elevational view of the embodiment shown in FIG. 7; and,*
*FIG. 12 is a left side view of the embodiment shown in FIG. 7.*
*The broken line in FIGS. 7-12 illustrate portions of the navigational device, which form no part of the design in the second embodiment.*

1 Claim, 4 Drawing Sheets

Figure 2:
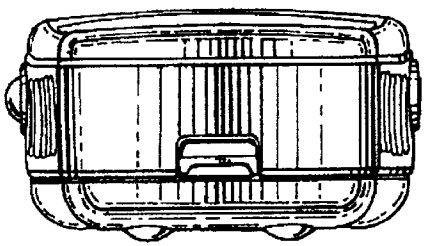
Figure 3:
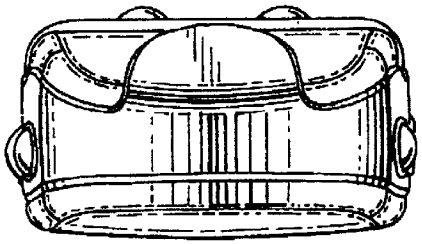
Figure 1:
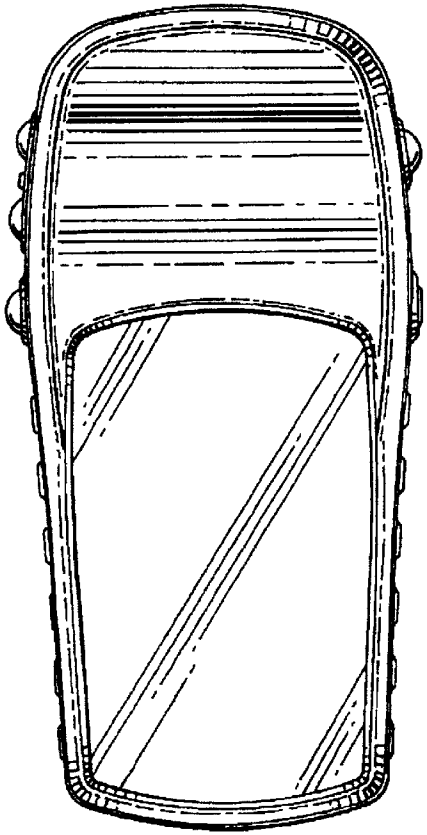
Figure 6:
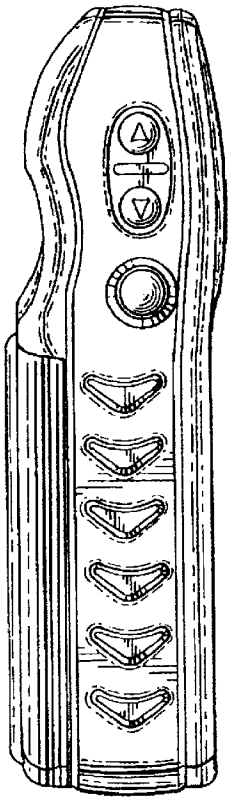
Figure 5:
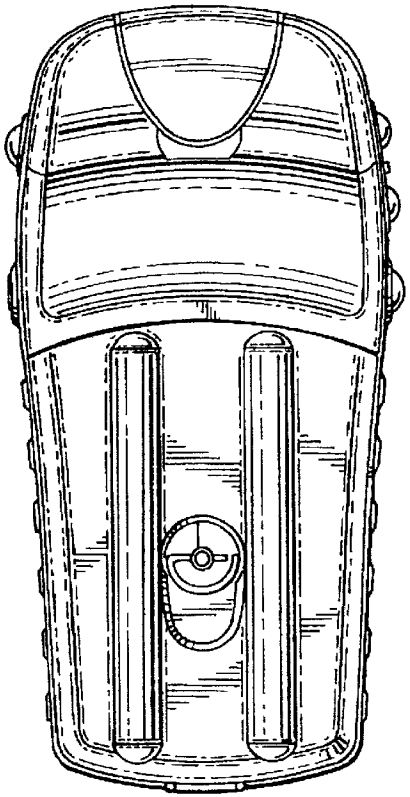
Figure 4:
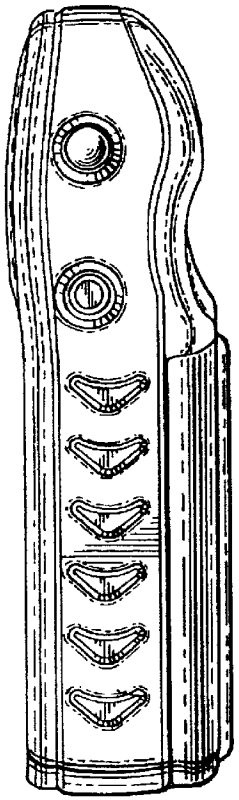

Matter enclosed in heavy brackets [ ] appears in the original patent, but forms no part of this reissue; matter printed in italics indicates the additions made by reissue.

U.S. PATENT DOCUMENTS

D404,666 S * 1/1999 Wrisley ..... D10/78
D412,450 S * 8/1999 McCain ..... D10/78
D497,817 S * 11/2004 Lord ..... D10/78
D566,591 S * 4/2008 Nelson et al.
D566,592 S * 4/2008 Nelson et al.
D598,306 S * 8/2009 Chernin et al.

* cited by examiner

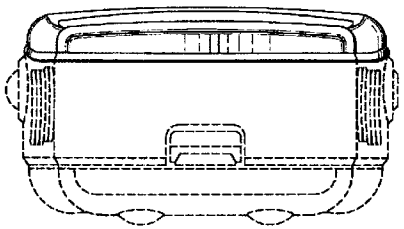
Fig. 8.
NEW
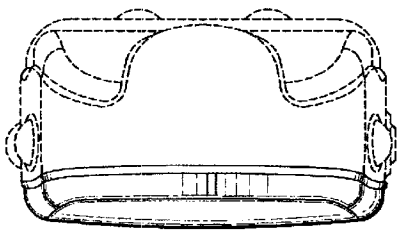
Fig. 9.
NEW
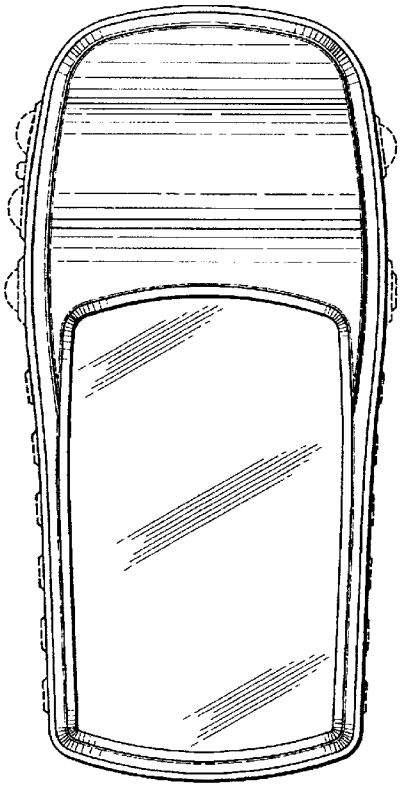
Fig. 7.
NEW

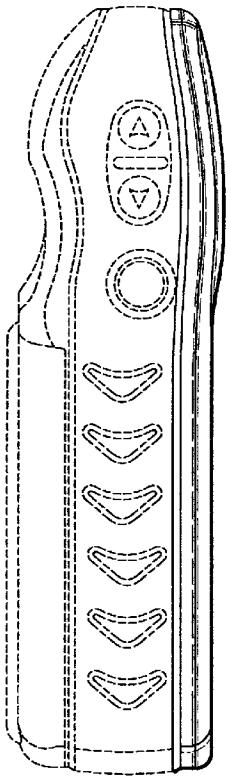
Fig. 12.
NEW
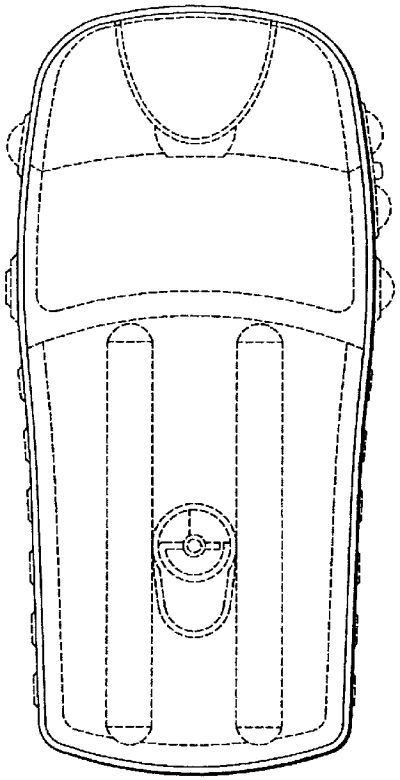
Fig. 11.
NEW
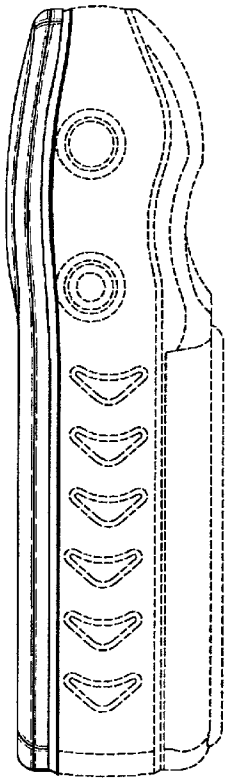
Fig. 10.
NEW